United States Patent
Venkatesan et al.

(10) Patent No.: US 7,512,232 B2
(45) Date of Patent: Mar. 31, 2009

(54) GENERATION AND VALIDATION OF SHORT DIGITAL SIGNATURES WITH IMPLICIT MESSAGE EMBEDDING

(75) Inventors: Ramarathnam Venkatesan, Redmond, WA (US); Peter L. Montgomery, San Rafael, CA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 10/625,363

(22) Filed: Jul. 23, 2003

(65) Prior Publication Data
US 2005/0036621 A1 Feb. 17, 2005

(51) Int. Cl.
*H04L 9/00* (2006.01)
(52) U.S. Cl. .......................................................... 380/44
(58) Field of Classification Search ................... 380/44
See application file for complete search history.

(56) References Cited

U.S. PATENT DOCUMENTS

| 6,128,737 | A | 10/2000 | Jakubowski et al. |
| 6,209,093 | B1 * | 3/2001 | Venkatesan et al. ......... 713/176 |
| 6,226,742 | B1 | 5/2001 | Jakubowski et al. |

FOREIGN PATENT DOCUMENTS

DE  EP 1083700 A2 *  3/2001

* cited by examiner

*Primary Examiner*—Kambiz Zand
*Assistant Examiner*—Jason K Gee
(74) *Attorney, Agent, or Firm*—Lee & Hayes, PLLC

(57) ABSTRACT

An implementation of a digital signature technique, described herein, generates, and another implementation of a digital signature technique, also described herein, validates, a hidden plaintext or ciphertext message wherein one or more portions of that message have another ciphertext message implicitly embedded therein. In other implementations, two or more portions of that message have another ciphertext message implicitly embedded therein. This abstract itself is not intended to limit the scope of this patent. The scope of the present invention is pointed out in the appending claims.

28 Claims, 4 Drawing Sheets

GENERATION AND VALIDATION OF SHORT DIGITAL SIGNATURES WITH IMPLICIT MESSAGE EMBEDDING

TECHNICAL FIELD

This invention generally relates to a technology for cryptography.

BACKGROUND

For as long as information has been communicated between two individuals, it has always been susceptible to third-party interception, eavesdropping, compromise and/or corruption. Traditionally, this problem has been handled through the development, over the years, of increasingly sophisticated cryptographic techniques.

One class of these techniques involves the use of key-based ciphers. In particular, through a key-based cipher, sequences of intelligible data (i.e., "plaintext") that collectively form a message are each mathematically transformed, through an enciphering algorithm, into seemingly unintelligible data (i.e., so-called "ciphertext").

Such transformations are typically completely reversible. This means that the enciphering algorithm is invertible: each ciphertext can be transformed back to its corresponding original plaintext, and each element of plaintext can be transformed into one and only one element of ciphertext.

In addition, it is desirable for a particular cipher that generated any given ciphertext to be sufficiently secure from cryptanalysis. To provide a requisite level of security, typically a unique key is selected which defines a unique corresponding cipher. This precludes, to the extent possible, a situation where multiple differing keys each yields reversible transformations between the same plaintext-ciphertext correspondence.

The strength of any cryptographic technique (and hence the degree of protection it affords from third-party intrusion) is directly proportional to the time required, by a third party, to perform cryptanalysis. While no encryption technique is completely impervious from cryptanalysis with unlimited resources, ensuring that without the secret key an immense number of calculations and an extremely long time interval are required with today's computing technology effectively rendering many techniques, for all practical intents and purposes, sufficiently secure to warrant their widespread adoption and use.

However, computing technology and cryptanalytic techniques continue to rapidly evolve. Processors, unheard of just a few years ago in terms of their high levels of sophistication and speed, are becoming commercially available at ever decreasing prices. What might have taken years of continual computing a decade ago can now be accomplished in a very small fraction of that time. Hence, as technology evolves, the art of cryptography advances in lockstep in a continual effort to develop increasingly sophisticated cryptographic techniques that withstand correspondingly intensifying cryptanalysis.

However, encryption, by itself, provides no guarantee that an enciphered message can not be or has not been compromised during transmission or storage by a third party. Encryption does not assure integrity. An encrypted message could be intercepted and changed, even though it may be, in any instance, practically impossible, to cryptanalyze.

In that regard, the third party could intercept, or otherwise improperly access, a ciphertext message, then substitute a predefined illicit ciphertext block(s) which that party, or someone else acting in concert with that party, has specifically devised for a corresponding block(s) in the message; and thereafter, transmit that resulting message with the substituted ciphertext block(s) onward to a destination. All of this may be done without the knowledge of the eventual recipient of the message and to the eventual detriment of the original message sender and/or its recipient.

For example, if the message involved a financial transaction between a purchaser and a seller, the substituted block could be an enciphered account number of a third party rather than that of the intended seller; hence, with an eventual effect of possibly illicitly diverting money originally destined to the seller to the third party instead. For a variety of reasons, messages carried over the Internet are vulnerable in this regard.

Detecting altered communication is not confined to Internet messages. With the burgeoning use of stand-alone personal computers, very often, an individual or business will store confidential or other information within the computer, such as on a hard-disk therein, with a desire to safeguard that information from illicit access and alteration by third-parties.

Password controlled access—which is commonly used to restrict access to a given computer and/or a specific file stored thereon—provides a certain, but rather rudimentary, form of file protection. Often users are cavalier about their passwords, either in terms of safeguarding their password from others or simply picking passwords that others can easily discern; thereby creating a security risk. Once password protection is circumvented, a third party can access a stored file and then change it, with the owner of the file then being completely oblivious to any such change.

SUMMARY

Described herein is a technology generally related to cryptography.

An implementation of a digital signature technique, described herein, generates, and another implementation of a digital signature technique, also described herein, validates, a hidden plaintext or ciphertext message wherein one or more portions of that message have another ciphertext message implicitly embedded therein. In other implementations, two or more portions of that message have another ciphertext message implicitly embedded therein.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of Generation and Validation of Short Digital Signatures with. Implicit Message Embedding that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of Generation and Validation of Short Digital Signatures with Implicit Message Embedding may be referred to as an "exemplary short digital signature generator/validator". Alternatively, an example embodiment of a generator may be referred to as an "exemplary short digital signature generator", and an example embodiment of a validator may be referred to as an "exemplary short digital signature validator".

Those who are skilled in the art are directed to find additional useful and relevant information in the following co-owned U.S. Pat. No 6,209,093, issued Mar. 27, 2001, titled "Technique For Producing A Privately Authenticatable Product Copy Indicia And For Authenticating Such An Indicia".

Figure 4:
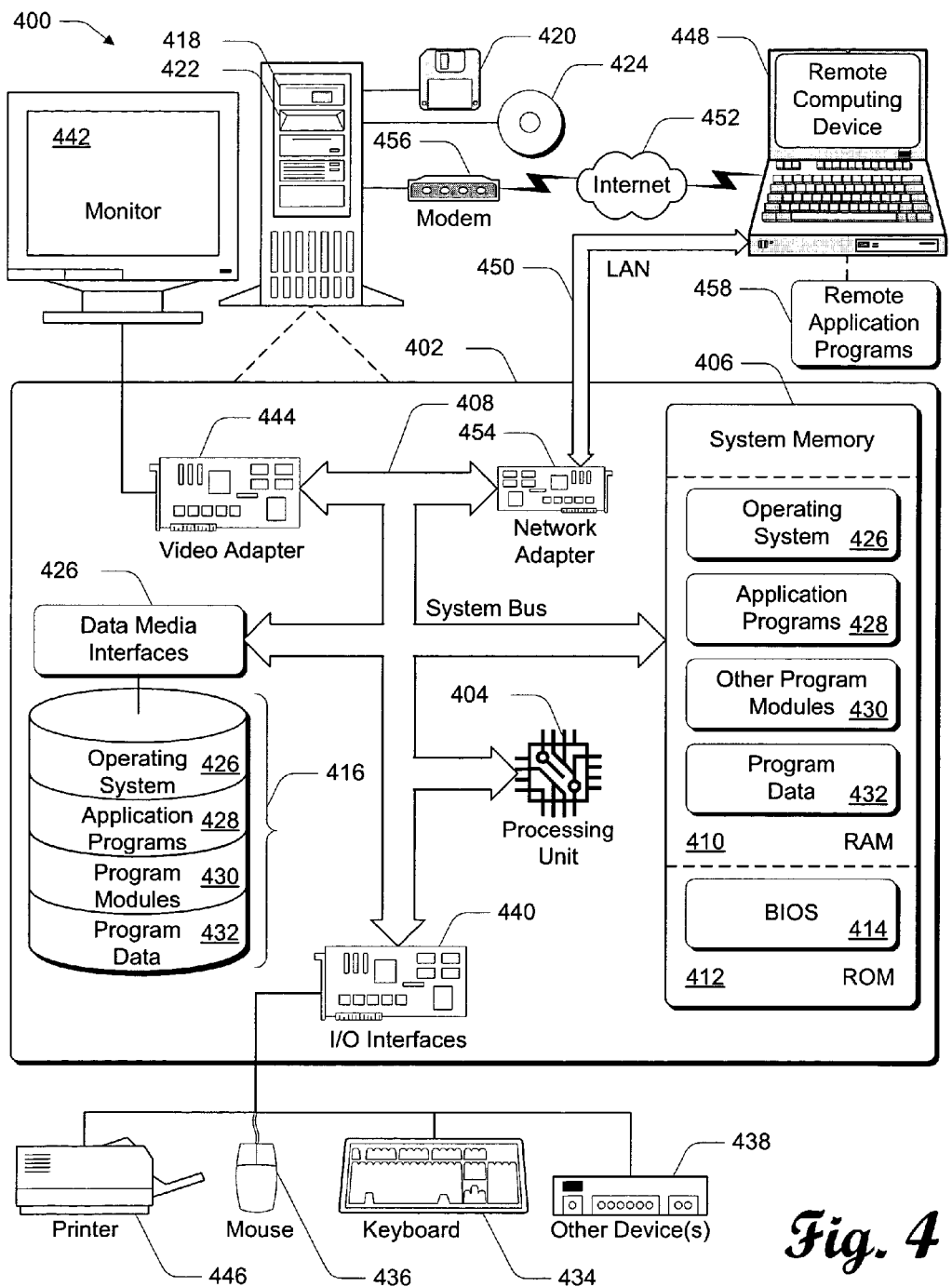
FIG. 4 is an example of a computing operating environment capable of (wholly or partially) implementing at least one embodiment described herein.

The one or more exemplary implementations, described herein, of the present claimed invention may be implemented (in whole or in part) by a computing environment like that shown in FIG. 4.

Product Identification (PID) Code

Since software is so often and so easily reproduced, software manufacturers typically require a validation process to enable full functionality of their product. That validation process typically includes the use of a special code, that, when manually entered, enables the full functionality of the product.

This often involves the use of a special ciphertext that is typically imprinted on the media's case or on the accompanying literature. Commonly, this ciphertext is called a product identification (PID). Since this PID is typically manually entered, it is typically desirable to shorten the length of the PID; thereby, improving the overall customer's installation experience.

One conventional PID validation procedure includes the following:

When prompted to do so during the software installation process, the user manually enters the PID found on the media's case found in the retail package of the software;

The installation software validates the PID entered using secret cryptographic tests.

Alternatively, the target computer may communicate with a central server computer associated with the software manufacturer. That communication may seek validation from the server based upon the manually entered PID.

Upon validation, the software's full functionality is enabled.

Introduction

The exemplary short digital signature generator, described herein, generates, and the exemplary short digital signature validator, also described herein, validates, a ciphertext message wherein at least two portions of that message have another ciphertext message implicitly embedded therein.

As used herein, the word implicit refers to the fact the existence of a hidden plaintext or ciphertext whose content is not readily apparent in the ciphertext (an encoding of the signed message) itself. Furthermore, in, at least one embodiment, it refers to such a ciphertext message where knowledge of the signer's private key (of a public-private key infrastructure) is insufficient to discover the implicit message in the ciphertext.

In at least one embodiment, the exemplary short digital signature generator/validator seeks to provide an opportunity to find a balance between maximizing the customer's experience (by minimizing the length of the manually entered ciphertext PID) while minimizing the PID's vulnerability to cryptanalysis and other attacks. In other words, it is desirable for the ciphertext PID to be short enough that the customer will tolerate manually entering it, but long enough and/or complicated enough that the ciphertext PID provides a high degree of security from digital pirates.

Exemplary Ciphertext Generation

With at least one embodiment, the exemplary short digital signature generator is a central server that may also be called the "signer". For a software manufacturer, it is the central system to generate each PID associated with a specific manufactured product.

The exemplary short digital signature generator produces a digital signature of a given message M encoding a pair $<M_1, M_2>$ as $(M_1, r, s, auth)$ with the $M_2$ part implicitly embedded in $(r, s)$.

If, for example, $|s|=2L$ and $|r|=L$, the security of the system may be approximately $2^L$ operations on the elliptic curve group (rather than hash functions) using some standard assumptions.

In one embodiment, a rather low value $L=33$ is chosen and extra design considerations are presented to make it more difficult for an attacker to optimize her computations.

Herein, auth is an authenticity tag. This tag adds another level of security to the ciphertext. But the relationship between auth and a pair $<M_1, M_2>$ is established by a random (or pseudorandom) function which is private to the signer.

In the event (which is more likely the smaller L is) of a public key being compromised, the probability that a signature generated by a pirate will get through a server is $2^{-l}$ where l is the length of the authenticity tag attached to the signature—this signature can be verified at a central server.

In the discussion below, G is a fixed group and g is a fixed element of order q in G. The exemplary short digital signature generator uses a special secret key BK which is a random (or pseudorandom) binary string that is sufficiently long (e.g., 128 bits). The exemplary short digital signature generator also uses four predefined hash functions $H_0, H_1, H_2, H_3$ that are instantiated by using keyed versions of a secure hash function H (e.g. SHA-1). Thus $H_i(x)=H(Key_i, x)$.

An example pseudo-code for a function for generating an implicit ciphertext message (in accordance with the exemplary short digital signature generator) when given a message M which has already been divided into $M_1$ and $M_2$ is provided here:

SIGN($M_1$, $M_2$)

Find a k with $H_0(M_1, g^k) = M_2$.

$r = H_1(M_1, g^k)$ $s = k/(r+1) - xH_2(M_1, g^k) \mod q$ $auth = H_3(BK, g^k)$ return ($M_1$, r, s, auth), which is one embodiment of the digital signature Here x is the signer's secret exponent. Note that here $M_1$ and $M_2$ are parts of the input to the above exemplary pseudocode of a methodological implementation (in accordance with the exemplary short digital signature generator).

The above methodological implementation assumes that many or all possible values of the second parameter $M_2$ will occur within the messages that need be signed by this methodological implementation, while the first parameter $M_1$ stays fixed. It creates an array large enough to accommodate all possible values of the second parameter $M_2$.

The task of finding a k with $H_0(M_1, g^k) = M_2$ in the first line can be done efficiently using the so called "coupon collector" principle. That is, starting with a fixed $M_1$, one picks a value of k and computes the corresponding hash value $M_2 = H_0(M_1, g^k)$. Save k in a table indexed by $M_2$. Select more k's until there is a known k for every possible $M_2$. Use this k when signing a message that can be viewed as a concatenation of binary strings denoting $M_1$ and $M_2$. In short, the coupon collector principle says that if the $H_0$ function behaves randomly and if one tries this hashing step slightly more often than the number of possibilities for $M_2$ then for every value of $M_2$ there will be at least one trial value of k that satisfies the equation—with a good probability.

Alternative implementations may employ fewer bits for r,s while increasing that group size.

Methodological Implementation

Figure 1:
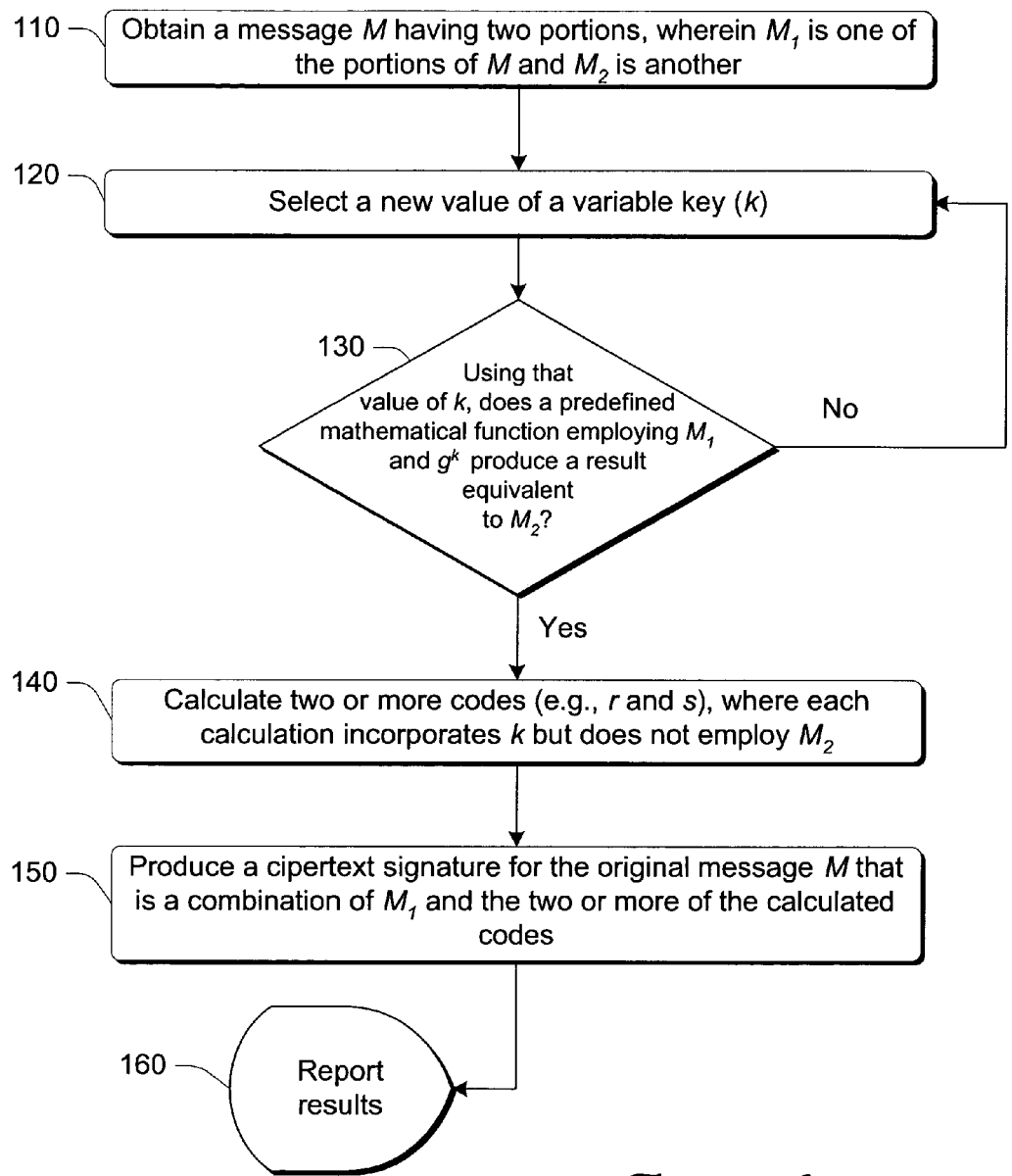
FIG. 1-3 are flow diagrams showing methodological implementations described herein.

FIG. 1 shows a methodological implementation of the exemplary short digital signature generator. This methodological implementation may be performed in software, hardware, or a combination thereof.

At 110 of FIG. 1, the exemplary short digital signature generator obtains a message M having two portions, wherein $M_1$ is one of the portions of the M and $M_2$ is another.

At 120-140, the exemplary short digital signature generator generates one or more codes (e.g., (r,s)) having a combination with $M_2$ implicitly embedded therein. In some implementations, more than one code is used. Examples of codes in this context include digitally signed message, codewords, or ciphertext.

The exemplary short digital signature generator implicitly embeds some portion (here, it is $M_2$) of the message M into a digital signature (DS). The length of $M_2$ may be, for example, 20 bits. Otherwise, every message would have $2^{|k|} = 2^{64}$ possible valid signatures. In this example, there are only $2^{64-20} = 2^{44}$ possible values of $g^k$.

At 120, the exemplary short digital signature generator selects an initial value of a variable per-message key (k).

At 130, it tests to see whether where a predefined mathematical function employing $M_1$ and $g^k$ (for the selected value of k) produces a value equal to $M_2$. If not, then it returns to 120 to select a new value of k. If so, then it goes to block 140.

At blocks 120-130, the exemplary short digital signature generator is finding a value of a variable per-message key (k) where a predefined mathematical function employing $M_1$ and $g^k$ produces a result equivalent to $M_2$. This function may include hashing.

At 130, it tests whether the result is equivalent to $M_2$. If not, it returns to block 120 and selects a new value of k. The selection of a new value of k may be accomplished using many suitable approaches. For example, it may selected randomly, pseudorandomly, sequentially, using a fixed pattern, within a fixed number field, or along a predefined mathematical formula (or curve).

If k is equivalent, then it goes the next block 140. At 140, it calculates the one or more codes (e.g., (r,s,auth)), where the calculation of one code is not identical to the calculation of any other code and where each calculation incorporates k. These code calculations do not employ $M_2$. Therefore, $M_2$ cannot be derived from reverse engineering these code calculations. These calculations may include hashing. In some implementations, more than one code is used. Examples of codes in this context include digitally signed message, codewords, or ciphertext.

At 150, the exemplary short digital signature generator produces a cipertext signature for the original message M. It produces a digital signature that is a combination of $M_1$ and the one or more codes (e.g., ($M_1$, r, s, auth)).

At 160, it reports the one or more codes and/or the digital signature (e.g., ($M_1$, r, s, auth)).

EXAMPLE

Message M=<$M_1$,$M_2$>

Length of digital signature (e.g., a PID)=114 bits

Format of the signature=($M_1$, r, s, auth), where $M_1$ has 11 bits which may denote the site code and upgrade flag, r has 32 bits, s has 64 bits, and auth has 7 bits for an authenticity check.

Underlying group for Discrete Log problem: Work in elliptic curve subgroup G of order $q \approx 2^{64}$ modulo a 512-bit prime. This is a larger subgroup and larger modulus than the earlier conventional approaches. This is possible because one may embed several bits (e.g., 20 bits) of the message into the digital signature implicitly.

Private key: Exponent x, group order q

Semiprivate (known only to the signer and authentication server): Backdoor key BK Public: Generator g for subgroup, $y = g^x$.

Of course, one may choose another modulus size, such as 1024 bits.

But the above subgroup's order q is much smaller: the best known ways to compute discrete logs use a Pollard rho type of algorithm, which takes roughly the same amount of time as solving discrete log in this black box subgroup. In this case the assumption is similar to the subgroup assumption in NIST's (National Institute Of Standards and Technology) DSA (Digital Signature Algorithm) based on discrete log modulo a large prime.

Also, if an implementation used special curves, one has to evaluate the effects of attacks that use their special properties.

The exemplary short digital signature generator may use a specific curve for which the complex multiplication field is known directly. In this, one may use a twist of the curve to obtain another curve whose equation will appear to have different structure.

Amortized Signature Generator

The acts of blocks 120-140 of FIG. 1 may need to be repeated many times to find a value of k that satisfies the conditions. On average, it may need to be repeated $2^{Length(M_2)}$ times. If one needs to generate thousands or millions of such cipertext, then this can be quite expensive.

When generating a large number of signatures having (e.g., several thousand or millions) having the same $M_1$, one may amortize this cost so that it averages only a few (e.g., 14) trials to find k rather than $2^{Length(M_2)}$ times.

The concept is well-known to those skilled in the art as the "coupon collector problem". In brief, the problem is stated like this: If one randomly throws N balls into n bins, how large must N be so the probability that all bins are nonempty is very close to one? According to the commonly held solution to the problem, it can be shown that N is of the order n ln n.

With the exemplary short digital signature generator, if n represents the number of digital signatures that one wants and N represents the number of candidates $g^k$ (with appropriate hashing) one must try, then the estimated work load N/n goes up by a factor of ln n. If n is a million then this factor is around 14.

The calculations in the coupon collector problem show that if we do not care if a few bins remain empty (or equivalently if we are less confident that all bins are occupied) then the factor can be lowered.

Exemplary Ciphertext Validation

The exemplary short digital signature validator validates a digital signature ($M_1$,r, s, auth), at least in part, by determining whether (r,s) actually implicitly contains or hides $M_2$.

In an implementation using PID activation for software, this validation may occur at a target client computer and/or at a separate central validation computer that communicatively connects to the target computer.

The following pseudo-code for a function for validating a digital signature (in accordance with the exemplary short digital signature validator) of a message M (which is divided into $M_1$ and $M_2$) when given a digital signature ($M_1$,r,s,auth), where (r,s) implies $M_2$. By way of illustration and not limitation, this exemplary client-side implementation does not reference auth, although server-side implementations can reference auth.

CLIENT_VALIDATE($M_1$,r,s,auth)
$gk=(g^s \cdot y^{H_2(M_1,r)})^{r+1}$
$M_2=H_0(M_1, gk)$
Test whether $H_1(M_1, gk)=r$.
If successful, return the pair M=<$M_1$,$M_2$>.

Figure 2:
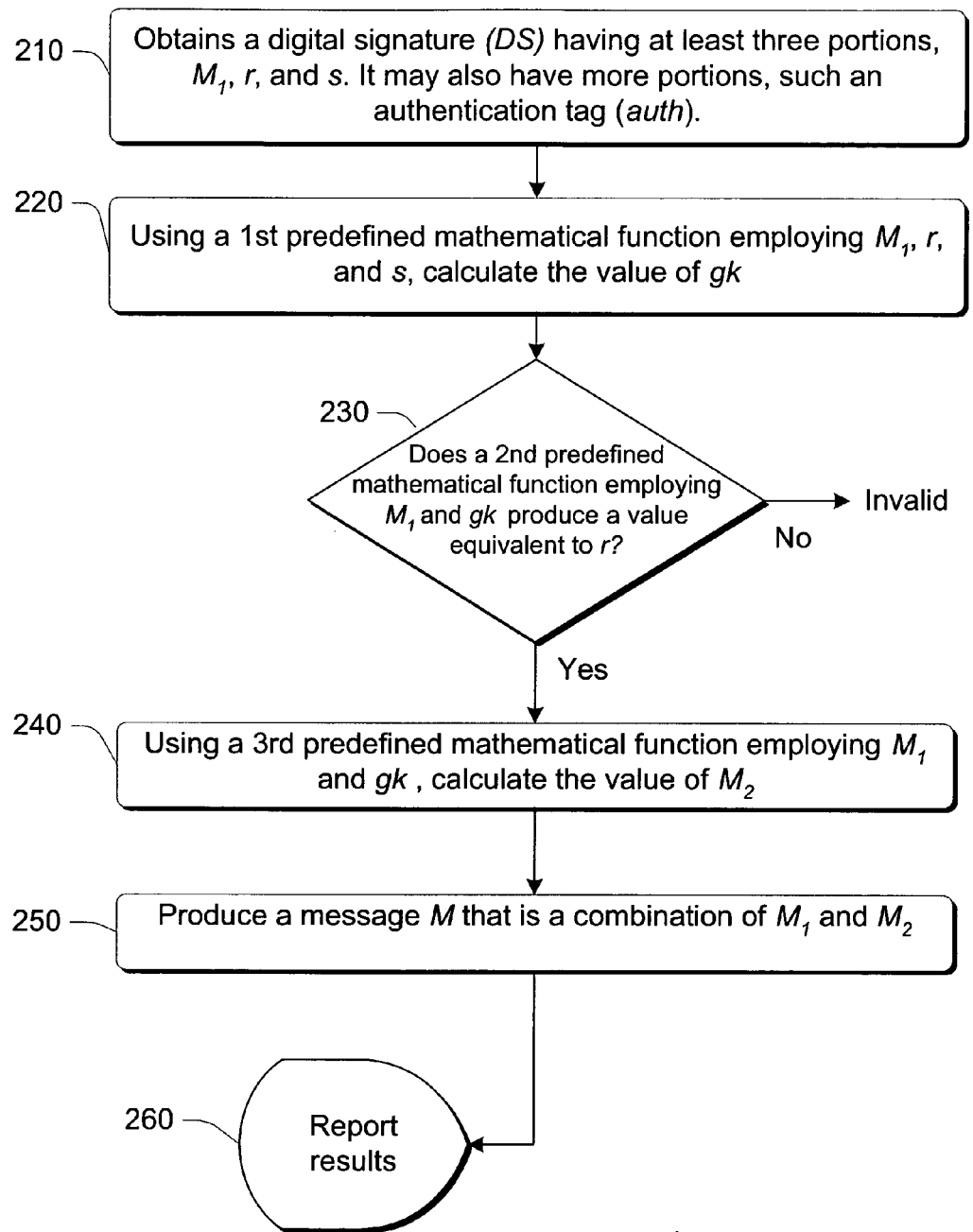

FIG. 2 shows a methodological implementation of the exemplary short digital signature validator. This methodological implementation may be performed in software, hardware, or a combination thereof.

At 210 of FIG. 2, the exemplary short digital signature validator obtains a digital signature (DS) having at least three portions, $M_1$, r, and s. It may also have more portions, such an authentication tag (auth). One example of how it may obtain the digital signature (DS) is when a human computer user manually enters it at a client computer. This (DS) may be a PID associated with a software product and printed on its packaging.

At 220, using a first predefined mathematical function employing $M_1$, r, and/or s, the exemplary short digital signature validator calculates the value of gk.

At 230, it determines whether a second predefined mathematical function employing $M_1$ and gk produces a value equivalent to r.

If the value of the product of the second predefined mathematical function employing $M_1$ and gk is equivalent to r, then proceed to block 260; otherwise, the result is invalid and the process ends.

At 240, using a third predefined mathematical function employing $M_1$ and gk, the exemplary short digital signature validator calculates the value of $M_2$.

These mathematical functions may include hashing so that specific length results are produced.

At 250, it produces a message comprising $M_1$ and $M_2$.

At 260, it may report the message and indicate the result of the determination of block 230.

Server-Side Implementation

The authenticity tag adds another level of security to the digital signature. The relationship between authenticity tag and a pair <$M_1$,$M_2$> is established by a random (or pseudo-random) function which is private to the signer. This uses the backdoor key (BK). This BK is known only by the original signer and by the centralized (and presumably secure) validation system.

In the event (which is more likely the lower L is) of a public key being compromised, the probability that a signature generated by a pirate will get through a server is $2^{-l}$ where l is the length of the authenticity tag attached to the signature—this signature can be verified at a central server.

The following pseudo-code for a function for validating a digital signature (in accordance with the exemplary short digital signature validator) of a message M (which is divided into $M_1$ and $M_2$) when given a digital signature ($M_1$,r,s,auth), where (r,s) implies $M_2$.

In addition, the following pseudo-code tests whether the given signature is valid and authentic (i.e., could not have been produced by someone who has broken only the public key). This is performed by the centralized validation system.

SERVER_AUTHENTICATE($M_1$,r,s,auth)

Do a client test, namely call CLIENT_AUTHENTICATE ($M_1$,r,s,auth)

Also check whether auth is correct (using BK).

Figure 3:
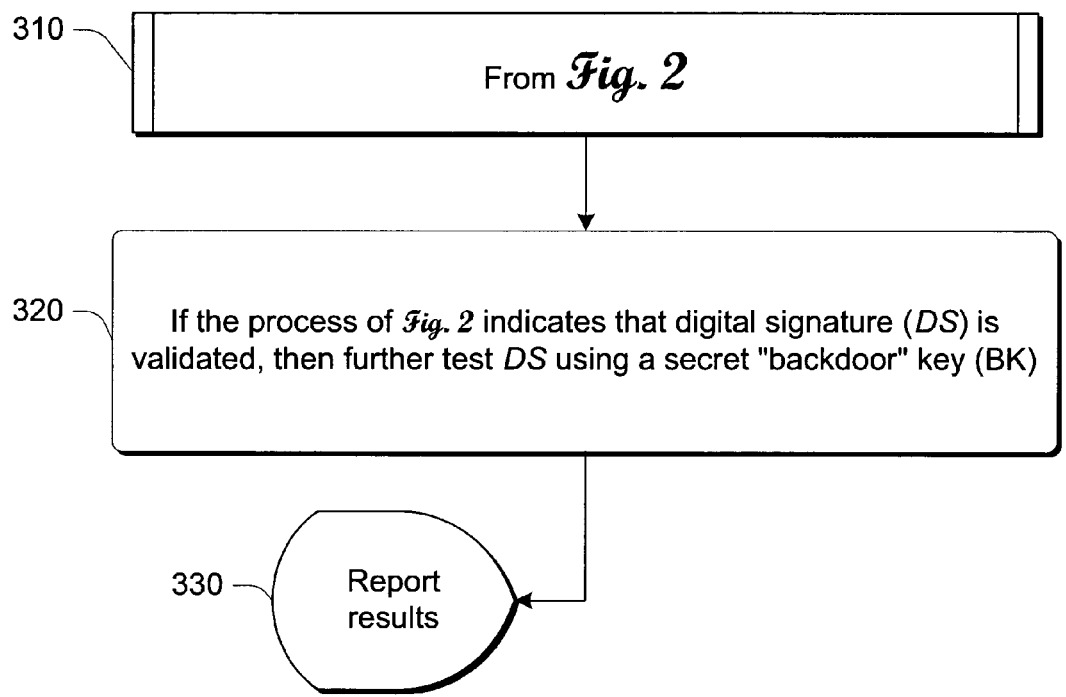

FIG. 3 shows another methodological implementation of the exemplary short digital signature validator. This methodological implementation may be performed in software, hardware, or a combination thereof.

At 310, the exemplary short digital signature validator performs the functions of FIG. 2. It may obtain the digital signature (DS) via remote communications mechanisms. Examples of such include direct point-to-point telephonic connection, Internet, Local Area Network (LAN), Wide Area Network (WAN), Intranet, and wireless communications. These communications may be accomplished using human intermediaries by the human users calling in to a central call-center or communicating via fax or postal mail.

If the above returns a message comprising $M_1$ and $M_2$ (which indicates that the "client" validation was successful), then the exemplary short digital signature validator performs, at 320, an additional validation testing using a secret key (BK) that is only known to the signer and the centralized validation system.

At 330, it reports the results of such validation.

A Quadratic Approach

Alternatively, the mathematical functions and calculations may be non-linear (quadratic, for example) in s. In this case the signature is computed by solving the equations below for the values of r and s:

$$r=H_1(M_1, g^k) \text{ where } k=s^2+x\,H_2(M_1, r)s \bmod q$$

In this case the verification is done by computing a candidate gk for $g^k$ using $gk=[g^s y^{H_2(M_1,r)}]^s$ and then testing whether $H_1(M_1, gk)=r$. The signer picks some k, computes r as above, computes $h:=H_2(M_1, r)$, and solves a quadratic equation for s modulo the prime q.

By suitably choosing the modulus, one may make the square root extraction straight forward and use the standard formula for solution of quadratics, namely $$s=2^{-1}(-xh\pm\sqrt{x^2h^2+4k}).$$

If the required square root does not exist, then the signer can look for another k, which will give a fresh quadratic. Another signer strategy sets h:=h+1 or h:=$H_2$(Msite,r+1) and tries again until a root is found. The number of iterations may be bounded. The validator tries successive values of h until the signature verifies. If h:=$H_2(M_1$, r+1) is used, then hash values are random, so the probability that it takes exactly a iterations is $2^{-\alpha}$ (for $\alpha$>0) and thus the expected number of trials is 2.

The significance of the non-linear approach is that for small values of parameters, it prevents the attacker from optimizing her cryptanalysis search by using some sequential search for the candidate values. This would be possible in case the verification equations compute candidate values of $g^k$ using one of the following:

$$gk=[g^s y^{H2(M_1,r)}]^{r+1}$$

$$gk=[g^s y^{H2(M_1)}]^{r+1}$$

In these cases an attacker could fix the values of r, $M_1$ and try successive values of s.

Exemplary Computing System and Environment

FIG. 4 illustrates an example of a suitable computing environment 400 within which an exemplary short digital signature generator/validator, as described herein, may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The exemplary short digital signature generator/validator may be implemented with numerous other general purpose or special purpose computing system environments or configurations. Examples of well-known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary short digital signature generator/validator may be described in the general context of computer-executable instructions, such as program modules, being executed by a computer. Generally, program modules include routines, programs, objects, components, data structures, etc. that perform particular tasks or implement particular abstract data types. The exemplary short digital signature generator/validator may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 may include, by are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media may be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 may be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 416, magnetic disk 420, optical disk 424, ROM 412, and/or RAM 410, including by way of example, an operating system 426, one or more application programs 428, other program modules 430, and program data 432.

A user may enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device may also be connected to the system bus 408 via an interface, such as a video adapter 444. In addition to the monitor 442, other output peripheral devices may include components such as speakers (not shown) and a printer 446 which may be connected to computer 402 via the input/output interfaces 440.

Computer 402 may operate in a networked environment using logical connections to one or more remote computers, such as a remote computing device 448. By way of example, the remote computing device 448 may be a personal computer, portable computer, a server, a router, a network computer, a peer device or other common network node, and the like. The remote computing device 448 is illustrated as a portable computer that may include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which may be internal or external to computer 402, may be connected to the system bus 408 via the input/output interfaces 440 or other appropriate mechanisms. It is to be appreciated that the illustrated network connections are exemplary and that other means of establishing communication link(s) between the computers 402 and 448 may be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Computer-Executable Instructions

An implementation of an exemplary short digital signature generator/validator may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exempllary Operating Environment

FIG. 4 illustrates an example of a suitable operating environment 400 in which an exemplary short digital signature generator/validator may be implemented. Specifically, the exemplary short digital signature generator/validator(s) described herein may be implemented (wholly or in part) by any program modules 428-430 and/or operating system 426 in FIG. 4 or a portion thereof.

The operating environment is only an example of a suitable operating environment and is not intended to suggest any limitation as to the scope or use of functionality of the exemplary short digital signature generator/validator(s) described herein. Other well-known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary short digital signature generator/validator may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embody computer readable instructions, data structures, program modules, or other data in a modulated data signal, such as carrier wave or other transport mechanism. Communication media also include any information delivery media.

The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-readable medium having computer-executable instructions that, when executed by a computer, performs a method for protecting digital media comprising:
obtaining a message M having two portions, wherein $M_1$ is one of the portions of the M and $M_2$ is another;

generating one or more codes having a combination with $M_2$ implicitly embedded therein, wherein calculations that generate the one or more codes do not employ $M_2$, and $M_2$ cannot be derived from these calculations of one or more codes, the generating further comprising:

finding a value of a variable per-message key (k) where a predefined mathematical function, $M_2=H_0(M_1, g^k)$, employing $M_1$ and $g^k$ produces a result equivalent to $M_2$, wherein g is a fixed element of order q in a fixed group, and $H_0$ is a predefined hash function instantiated by using a keyed version of a secure hash function;

when such a value of k is found, calculating the two or more codes, where one code is r and another is s, with r being calculated using another predefined mathematical function employing $M_1$ and $g^k$, $r=H_1(M_1, g^k)$, and with s being calculated using still another predefined mathematical function employing $M_1$ and $g^k$ and r, $s=k/(r+1)-x\ H_2(M_1, g^k) \bmod q$; and reporting the one or more codes, by which reporting the one or more codes facilitates a cryptographic technique for protecting digital media.

2. The medium as recited in claim 1, wherein the method further comprises producing a digital signature (DS) comprising $M_1$ and the reported one or more codes.

3. The medium as recited in claim 1, wherein two or more codes are generated by the generating and reported by the reporting.

4. The medium as recited in claim 3, wherein a mathematical function for calculating one code is not identical to a mathematical function for calculating another code.

5. The medium as recited in claim 3, wherein the message M has a defined length and a length of a combination of two or more codes is less than the message's defined length.

6. The medium as recited in claim 3, wherein $M_2$ has a defined length and a length of a combination of two or more codes is less than or equal to the defined length of $M_2$.

7. The medium as recited in claim 1, wherein the generating comprises:

finding a value of a variable per-message key (k) where a predefined mathematical function, $M_2=H_0(M_1, g^k)$, employing k produces a result equivalent to $M_2$, wherein g is a fixed element of order q in a fixed group, and $H_0$ is a predefined hash function instantiated by using a keyed version of a secure hash function;

when such a value of k is found, calculating the two or more codes, where the calculation of one code is not identical to the calculation of any other code, the calculation of at least one code employs non-linear mathematical function, and where each calculation incorporates k.

8. The medium as recited in claim 3, wherein the method further comprises producing a digital signature (DS) comprising $M_1$ and the reported codes.

9. A computing device comprising:
an output peripheral device;
the medium as recited in claim 1.

10. A computer-readable medium having computer-executable instructions that, when executed by a computer, performs a method comprising:

obtaining a message M having two portions, wherein $M_1$ is one of the portions of the M and $M_2$ is another, wherein the message M has a defined length and a length of a combination of two or more codes is less than the message's defined length and $M_2$ has a defined length and a length of a combination of two or more codes is less than or equal to the defined of $M_2$;

generating two or more codes having a combination with $M_2$ implicitly embedded therein, wherein calculations that generate the codes do not employ $M_2$ and $M_2$ cannot be derived from these calculations of two or more codes, wherein the generating comprises:

finding a value of a variable per-message key (k) where a predefined mathematical function, $M_2=H_0(M_1, g^k)$, employing $M_1$ and $g^k$ produces a result equivalent to $M_2$, wherein g is a fixed element of order q in a fixed group, and $H_0$ is a predefined hash function instantiated by using keyed versions of a secure hash function;

when such a value of k is found, calculating the two or more codes, where one code is r and another is s, with r being calculated using another predefined mathematical function employing $M_1$ and $g^k$, $r=H_1(M_1, g^k)$, and with s being calculated using still another predefined mathematical function employing $M_1$ and $g^k$ and r, $s=k/(r+1)-x\ H_2(M_1, g^k) \bmod q$; and reporting the two or more codes, by which reporting the two or more codes facilitates a cryptographic technique for protecting digital media.

11. The medium as recited in claim 10, wherein the method further comprises producing a digital signature (DS) comprising $M_1$ and the reported two or more codes.

12. The medium as recited in claim 10, wherein the calculation of at least one code employs a non-linear mathematical function.

13. The medium as recited in claim 10, wherein one calculated code is r and another is s, with r being calculated using another predefined mathematical function employing $M_1$ and $g^k$, and with s being calculated using still another predefined mathematical function employing $M_1$ and $g^k$ and r.

14. The medium as recited in claim 13, wherein the predefined mathematical function for s is non-linear.

15. The medium as recited in claim 13, wherein the method further comprises producing a digital signature (DS) comprising $M_1$ and the reported codes r and s.

16. A computing device comprising:
an output peripheral device;
the medium as recited in claim 10.

17. A method for facilitating digital security, the method comprising:

obtaining a message M having two portions, wherein $M_1$ is one of the portions of the M and $M_2$ is another;

generating two or more codes having a combination with $M_2$ implicitly embedded therein, wherein calculations that generate the codes do not employ $M_2$, and $M_2$ cannot be derived from these calculations of one or more codes, wherein the generating comprises:

finding a value of a variable per-message key (k) where a predefined mathematical function, $M_2=H_0(M_1, g^k)$, employing $M_1$ and $g^k$ produces a result equivalent to $M_2$, wherein g is a fixed element of order q in a fixed group, and $H_0$ is a predefined hash function instantiated by using keyed versions of a secure hash function;

when such a value of k is found, calculating the two or more codes, where the calculation of one code is not identical to the calculation of any other code and where each calculation incorporates k, wherein one calculated code is r and another calculated code is s, with r being calculated using another predefined mathematical function employing $M_1$ and $g^k$, $r=H_1(M_1, g^k)$, and with s being calculated using still another predefined mathematical function employing $M_1$ and $g^k$ and r, $s=k/(r+1)-x\ H_2(M_1, g^k) \bmod q$; and reporting the two or more codes, by which reporting the two or more codes facilitates a cryptographic technique for protecting digital media.

18. The method as recited in claim 17 further comprising producing a digital signature (DS) comprising $M_1$ and the reported two or more codes.

19. A digital signature (DS) produced by the method as recited in claim 18 and embodied on a computer-readable medium.

20. A digital signature (DS) produced by the method as recited in claim 18 and embodied as human-readable indicia on a human-readable medium.

21. The method as recited in claim 17, wherein the calculation of at least one code employs a non-linear mathematical function.

22. The method as recited in claim 17, wherein the message M has defined length and a length of a combination of two or more codes is less than the message's defined length.

23. The method as recited in claim 17, wherein $M_2$ has a defined length and a length of a combination of two or more codes is less than or equal to the defined length of $M_2$.

24. The method as recited in claim 17, wherein the predefined mathematical function for s is non-linear.

25. The method as recited in claim 17, wherein the predefined mathematical function for s is quadratic.

26. The method as recited in claim 17 further comprising producing a message comprising $M_1$ and the reported codes.

27. A computer-readable medium embodying a message produced by the method as recited in claim 26, by which the message functions with a processor to protect digital media.

28. A method comprising:
producing a message produced by the method as recited in claim 26 as human-readable indicia on a human-readable medium.

* * * * *